United States Patent

McKay et al.

[11] Patent Number: 5,844,905
[45] Date of Patent: Dec. 1, 1998

[54] EXTENSIONS TO DISTRIBUTED MAC PROTOCOLS WITH COLLISION AVOIDANCE USING RTS/CTS EXCHANGE

[75] Inventors: Danny Neil McKay, Toronto, Canada; Mahmoud Naghshineh, Fishkill, N.Y.; Claus Michael Olsen, Cortlandt Manor, N.Y.; Babak Rezvani, Chester, N.Y.; Parviz Kermani, South Salem, N.Y.; Peter Dirk Hortensius, Goldens Bridge, N.Y.

[73] Assignee: International Business Machines Corporation, Armonk, N.Y.

[21] Appl. No.: 677,145

[22] Filed: Jul. 9, 1996

[51] Int. Cl.$^6$ .................................................. H04L 12/413
[52] U.S. Cl. ......................... 370/443; 370/448; 370/450
[58] Field of Search ..................................... 370/329, 431, 370/443, 445, 447, 448, 450, 462; 340/825.5, 825.52, 825.54

[56] References Cited

U.S. PATENT DOCUMENTS

| | | | |
|---|---|---|---|
| 4,661,902 | 4/1987 | Hochsprung et al. | 340/825.5 |
| 4,689,786 | 8/1987 | Sidhu et al. | 370/255 |
| 5,231,634 | 7/1993 | Giles et al. | 370/348 |
| 5,371,494 | 12/1994 | Singh et al. | 340/825.5 |
| 5,592,483 | 1/1997 | Hieda et al. | 370/445 |

Primary Examiner—Hassan Kizou
Attorney, Agent, or Firm—Ronald L. Drumheller

[57] ABSTRACT

The throughput of a Request-to-Send and Clear-to-Send (RTS/CTS) based distributed media access control protocol is improved by reserving the medium in a hierarchical fashion. The shared medium is reserved for two stations called the participants. During the reserved period, a master (or primary) attribute and a slave (or secondary) attribute are given to the participants and the medium is shared between them using any suitable coordination algorithm. During the reserved time, the secondary can signal the primary station that it has data to send to the primary station and request that the primary and secondary roles or attributes be exchanged. In the case that a role exchange takes place, control of the medium is transferred from one station to another and data transfer in an opposite direction can take place without requiring another reservation. Observing stations which are not participating in the reservation can be invited to join the reservation as additional secondary stations if this does not cause any interference to any other existing reservations. The efficiency of the medium reservation may be improved also by piggy-backing any reservation specific signals onto data packets and by defining new response frames such as Hold-to-Send (HTS) and Free-to-Send (FTS) for flow control when there is a congested receiving station.

20 Claims, 3 Drawing Sheets

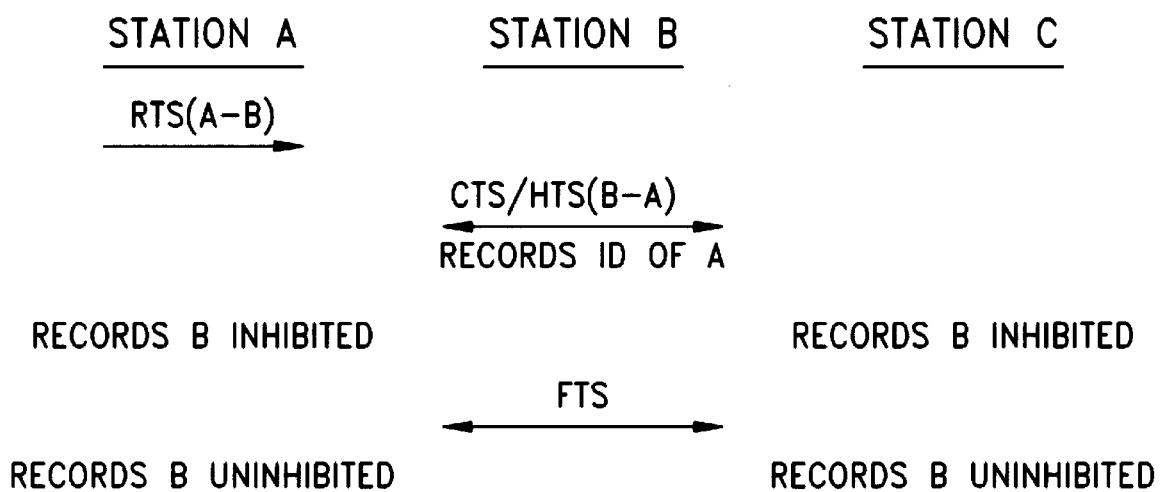

EXTENSIONS TO DISTRIBUTED MAC PROTOCOLS WITH COLLISION AVOIDANCE USING RTS/CTS EXCHANGE

FIELD OF THE INVENTION

This invention is in the field of wireless communication and relates to methods and arrangements for Media Access Control (MAC) and their extensions to random access protocols with collision avoidance.

BACKGROUND AND PRIOR ART

Distributed media access protocols with collision avoidance systems have been proposed and studied in the past (see References [1]–[3]). One class of major solutions which is used to combat the effect of collisions due to hidden nodes is based on a solution which uses a Request-to-Send (RTS) and Clear-to-Send (CTS) frame exchange to reserve the medium in the beginning of each transmission. In this solution, a station (A) sends one or more data packets to another station (B) by first sending an RTS packet destined to (B). If (B) receives the mentioned RTS packet, it replies with a CTS packet destined to (A) and in this way, (B) announces that a transmission from (A) to (B) is about to take place and that all stations that can interfere with such transmission and contribute to a collision at (B) should stay off the shared medium. In essence, an RTS/CTS exchange might be attempted for a number of times, before the medium can be reserved. This is typical for distributed media access control protocols. We refer to the average time that a station spends in contention trying to reserve the medium before each data transmission as the contention time($T^C$). The average time each station spends sending higher layer data packets after a successful reservation is referred to as the transmission time($T^T$). In general, the ratio $T^T/(T^T+T^C)$ can be used as the efficiency factor (U) of a reservation and as U increases the throughput increases. There are a large number of parameters that affect U such as system load or the collision window of the reservation. One way to increase U is to send multiple data packets after each successful reservation, this scheme is called a burst reservation.

SUMMARY OF THE INVENTION

The methods and arrangements described herein improve the performance (measured e.g. in terms of throughput) of a RTS/CTS based distributed media access control protocol. The medium reservation is done in a hierarchical fashion where first the shared medium is reserved for two stations called the participants. All other stations called observers stay quiet during the time reserved for the participants. In this fashion, a shared medium can be reserved for a subset of the plurality of devices. During this period called the reserved period, a master (or primary), and a slave (or secondary) station attribute can be given to the participating devices and the medium can be shared using another medium coordination algorithm which is not necessarily the same as the one used to reserve the medium for a reserved period in the first place. After the medium is reserved, the participating devices can establish a conventional point-to-point connection within the reserved time period between participating devices for a predefined period of time. Specifically, the primary attribute can be exchanged with a secondary attribute which in effect gives the control of the shared medium during the reserved period to another station different from the one that originally was assigned the primary attribute. During the reserved time, the secondary can signal the primary station that it has data to send to the primary station and request that the primary and secondary roles or attributes to be exchanged. In the case that a role exchange takes place, the control of the medium is transferred from one station to another and data transfer in an opposite direction can take place without requiring another reservation attempt. In essence, this reduces the additional time in contention mode. Furthermore, in another aspect of the invention observing stations which are not participating in the reservation can be invited to join the initial reservation as secondary stations if this does not cause any interference to any other existing reservations. In other aspects of the invention, we define a number of additional extensions in the RTS/CTS exchange to improve the efficiency of the medium reservation by piggy-backing any reservation specific signals on data packets or defining new response frames such as Hold-to-Send (HTS) and Free-to-Send (FTS) which are used for flow control techniques in response to a congested receiving station.

DESCRIPTION OF THE DRAWINGS

FIG. 3 depicts a flow control mechanism in accordance with this invention.

DETAILED DESCRIPTION OF PREFERRED EMBODIMENTS OF THE INVENTION

Underlying Transmission and Media Access Scheme

In this section we consider a wireless system with the following characteristics in order to provide a detailed description of the preferred embodiment. A random access scheme with collision avoidance (CA) based on a RTS/CTS exchange is used to access a shared wireless medium. Media reservations are made by exchanging RTS/CTS frames.

Data transmission from a source station (A) to a destination station (B) are followed by sending an ACK frame from (B) to (A). The medium can be reserved by a reservation exchange between (A) and (B) (e.g. an RTS-CTS exchange) and then one or more packets can be exchanged between (A) and (B).

The length of the time that the media is reserved can be announced by (A) and (B) in their reservation handshake or the termination of a reservation period can be announced by exchanging disconnect messages at the end of the transmission period. Here (A) sends a End-of-Burst (EOB) frame and (B) replies with a End-of-Burst-Confirm (EOBC) frame.

Primary/Secondary Role Exchange Within Reservation

We define a primary and secondary attribute within a reservation. Initially, a primary station (A) is the one that initiates the reservation by sending a RTS packet in a successful reservation attempt where the secondary station (B) is the recipient of the RTS which replies with a CTS. After the reservation is made successfully, the primary station (A) is the owner of the reserved medium and sends data or control frames to the secondary station (B). All other stations, such as C or D, are defined to be observers of this reservation. Here the primary acts as a master and the secondary acts as a slave and this defines the media coordination among active participants in the reservation. Now, a primary station (A) can send a message called Primary Secondary Role Exchange (PSRE) to a secondary station (B) initiating the exchange of roles between stations. As a result, the control of the medium will be passed from one station (A) to another station (B) within a reservation and the flow of data can be changed in the opposite direction where data frames are sent from (B) to (A) and acknowledged by (A). As long as this is done within the reserved time, all other stations that observe this reservation stay quiet and there should be no need for an RTS/CTS exchange and hence the throughput of the system can be increased since the data transmission after a PSRE happens without going through a reservation cycle or contention period.

Figure 1:
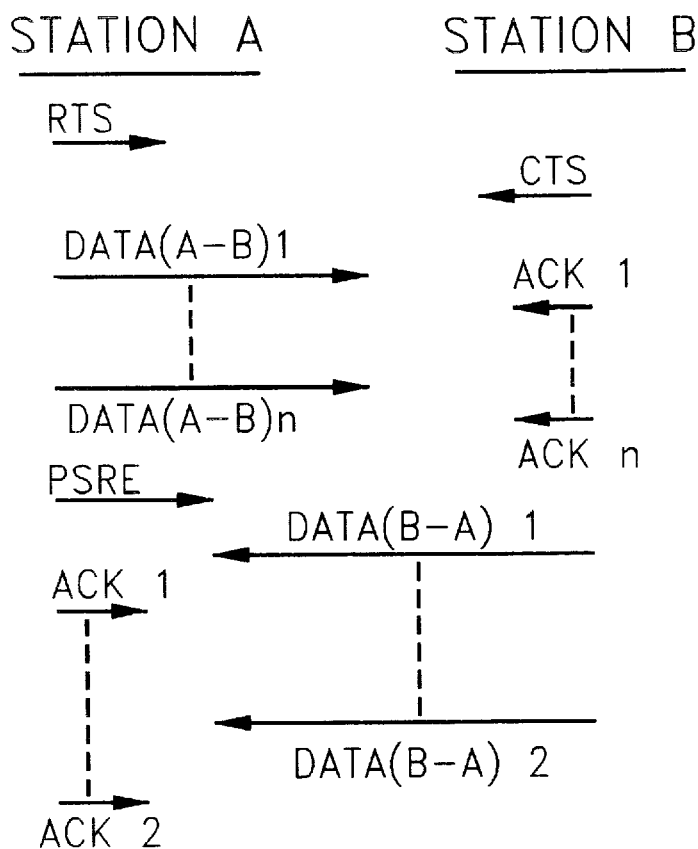
FIG. 1 depicts transmissions between two stations in accordance with this invention.

Referring to FIG. 1 which depicts transmissions between two stations, the PSRE frame can be sent based on a number of conditions which are described below:

After a primary station (A) finishes sending all data packets, available from higher layer protocols such as the logical link layer (LLC), to the secondary station (B). (A) will send a PSRE frame to (B) if according to the rules of the MAC protocol, there is still time left for the reservation made by (A). In this case, (B) becomes the primary of the reservation period and starts sending data frames to (A) if (B) has any such data frames destined to (A) and there is reservation time left to continue the transmission. If (B) does not have any data frames to send to (A) or when the reservation time expires, (B) signals to (A) to end the burst and the reservation is terminated implicitly by observing stations keeping track of the reservation time or by exchanging EOB/EOBC frames. A priority transmission queue can be set up by each station where acknowledgment packets from higher layers (e.g. LLC) are entered in such a priority queue ($Q^P$) and after a PSRE such frames are transmitted back to (A). This can improve the efficiency (U) and the throughput of the MAC considerably since higher layer ackcnowledgments at a receiving station release transmission windows on the transmitting station and this can be done in a rapid and effective manner as discussed in above.

As an alternative, the PSRE can take place when (B) sends data ACK packets to (A) where such ACK packets can indicate a request for PSRE which notify (A) that (B) had data to send to (A). In that case (A) can initiate a PSRE after it has sent its data and if there is still time reserved on the channel. This requires an ACK frame with PSRE information to be defined. It is important to note that within a reservation, multiple PSRE frames can take place.

A primary station (A) to identify the final frame that it has to send to (B) by piggy-backing such information in the data frame sent to (B) and giving (B) the opportunity for requesting a PSRE.

Joining a Reservation

Figure 2:
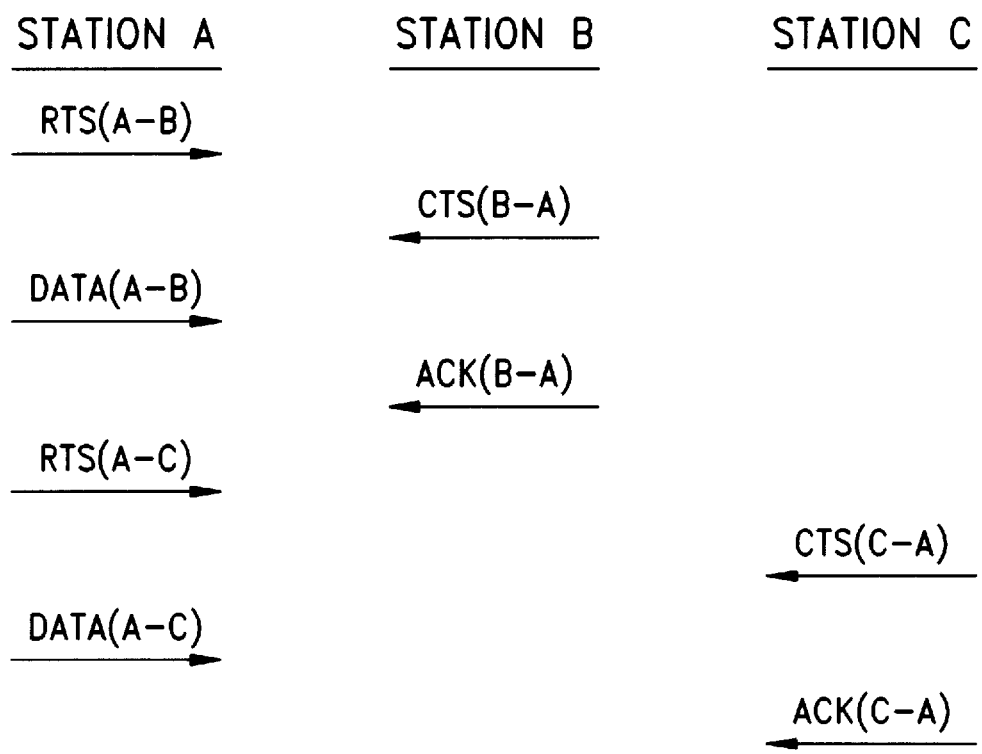
FIG. 2 depicts an exchange of roles of the primary station and secondary station in accordance with this invention.

Another method to improve the performance for the RTS/CTS based distributed reservation scheme is to invite observing stations to join the participating stations after a reservation is made as shown in FIG. 2. Again, we denote the two stations that initially set up a reservation with the RTS/CTS exchange as the participating stations with a primary station (A) and a secondary station (B). All other stations that are based on observing such a reservation stay QUIET during the reservation period as observing stations. Now, we describe an aspect of the invention whereby an observing station can join a reservation. A primary station can decide to "invite" an observing station (C) to become a secondary station in addition to all other secondary stations defined during that specific reservation time by sending an RTS to the observing station (C). Depending on the status of the set of devices with which (C) can interfere, there exist two cases:

If (C) does not have any information about any other reservation attempt that overlaps with the reservation originated by (A), then (C) can respond with a CTS and as a result (C) would announces that it is about to receive data from (A) and that all stations that can possibly interfere with (C), with the exception of (A), should stay quiet for some time T. This time T can be announced in the RTS packet sent to (C) or it can be the remaining reservation time based on the reservation that was originally made by (A) with respect to (B).

If (C) is aware of any other reservation attempt beside the one made by (A) (e.g., by observing whole or partial RTS/CTS exchanges, or frame transmissions originated by any station other than A or B), then (C) would not respond to (A)'s RTS transmission destined to (C) and as a result (A) would realize that (C) cannot join the reservation after it does not receive a CTS from (C) destined to (A) within a predefined time-out period.

Flow control mechanism with Hold-to Send (HTS) and Free-to-Send (FTS)

The flow control mechanism shown in FIG. 3 is designed to provide a means for a receiving station to tell other stations it is congested and cannot handle new requests. This will prevent other stations from making incorrect assumptions for the state of the congested station. A flow control (HTS/FFS) type mechanism increases the efficiency of the RTS/CTS based MAC protocols since it prevents a transmitting station from starting to send data frames to a receiving station that is congested and will be forced to discard the frames.

The HTS flow control mechanism can be initiated as a response frame to a primary station request control frame or piggybacked on an existing response frame.

1. HTS Indicators

The Hold-to-Send (HTS) is a control frame architected for responding to a Request-to-Send (RTS) when the destination is not ready to accept any data. In this scenario a HTS is sent in reply to an RTS, the transmitting station and all other stations are free to attempt for another reservation with other non-congested stations. The HTS can also be piggybacked on an existing response frame by using a special control bit in the control frame. Piggybaddng can be done on any control frame during the life of the reservation. All traffic directed at the congested station will be held until the Free-to-Send (FTS) frame is heard by the other stations.

2. FTS Indicators

The Free-to-Send (FTS) indicator must be sent to inform listening stations that congested condition has been resolved and it is now permissible to resume reservation attempts. The FTS indicator can be advertised in response to a received RTS frame if one is available or it can be sent via a control bit in the next available frame queued for transmission.

The flow control HTS/FTS mechanism can be honored by every station contending and within range or it may be honored by only participating stations. Either approach may be selected with different advantages for each.

Atomic RTS/CTS Exchanges

The atomic exchange is used to reduce the collision window in a medium which must contend with hidden nodes. This approach will minimize scenarios which create overlapping or ambiguous reservation scenarios.

The rules can be broken down into 2 multiple points:

Station (B) who receives multiple RTS frames, during the contention period, all directed to station (B) will use the LAST IN WIN rule. For example, if a station (B) receives multiple RTS packets destined to (B) which are originated from different stations before (B) replies with a CTS, it replies to the last RTS that it has received.

Station (B) who receives multiple RTS frames, during the contention period, directed at DIFFERENT stations will obey the FIRST IN RULE. For example, if a station (B)

received an RTS, directed at station (A) followed by an RTS directed at station (B) it would respect the first RTS frame, with the destination address not equal to station (B) and accept the loss of a reservation.

The second RTS frame directed at station (B) would indicate that the originator of the second RTS could not hear the originator of the first RTS and would eventually collide due to the hidden node problem. The recommended action in this situation is to ignore both RTS frames and return to the random BACKOFF state to prepare for the next contention period. This is considered as the conservative backoff approach to accommodate the hidden node problem.

The atomic RTS/CTS exchange is used to try and resolve asymmetric reservation scenarios by forcing both sides to participate in the reservation before accepting it as successful. An extension to the atomic RTS/CTS is to also force the requirement of an RTS/CTS/DATA atomic exchange. This would be used to cover the situation where a station could here the RTS and not a CTS. The DATA would confirm the success of the attempted reservation.

The atomic exchange is an additional rule to the RTS/CTS protocol as defined in [1]–[3]. This feature can decrease the collision probability in the medium and hence increase the performance of the protocol.

Combined DATA-EOB/ACK-EOBC Frames

In a burst reservation where end of burst transmission period is announced by sending a End-of-Burst (EOB)/End-of-Burst-Confirm (EOBC) pair of packets, the EOB information can be piggy-backed by the last Data frame and the EOBC can be piggy-backed by the ACK frame. This in turn increases the efficiency of the protocol.

Forgiving Channel

The completion of the atomic reservation transaction enables participants of the reservation to receive and process unauthorized packets, from non participating nodes, during the life span of the reservation. The action of permitting unauthorized packets from stations which have not recognized the state of the reservation cycle is considered as FORGIVING.

The aspect of a forgiving channel makes reservation participants within a reservation persistent with respect to channel interference, during DATA/ACK frame exchanges, and enables all participating stations, both the primary and secondary, suffering from interference to be persistent with the transmission inside of a reservation. During the reservation, if either the primary or secondary stations receive a control or data frame sent by a non-participating station (ie. the source address is not equal to either the primary or secondary station), the frame will be ignored. The status of the reservation will be unaffected.

REFERENCES

[1] V. Bhargavan, A. Demers, S. Shenlcer, L. Zhang, "MACAW: A Media Access Protocol for Wireless LANs" Proceeding of SIGCOMM 94, London, England, 8/94.
[2] K. C. Chen, "Medium Access Control of Wireless LANs for Mobile Computing", IEEE Network, Vol 8, No. 5, 1994.
[3] Wireless LAN Medium Access Control (MAC) and Physical Layer (PHY) specifications, Draft Standard IEEE 802.11, May 1995
[4] MAC Protocol for Wireless Communications, Patent CA9-93-019, 1993

We claim:

1. An improved communications network having a plurality of stations and a shared common communications medium using a collision avoidance media access protocol for communication between said stations, in which medium access is granted to a pair of stations obtaining a successful reservation of said medium, said pair of stations comprising a requester station and a target station, said requester station comprising a primary station, and said target station comprising a secondary station, wherein said primary station coordinates communication to said secondary station, the improvement comprising:

means for interchanging roles of said primary and secondary stations within said reservation, wherein said primary station becomes a secondary station and said secondary station becomes a primary station for communication therebetween.

2. The system of claim 1 wherein said means for interchanging roles is initiated by said primary station.

3. The system of claim 1 wherein said means for interchanging roles is initiated by said secondary station.

4. The system of claim 1 wherein said means for interchanging roles initiates interchange of roles by transmitting a primary-secondary-role-exchange (PSRE) control frame between said primary station and said secondary stations.

5. The system of claim 4 wherein said primary-secondary-role-exchange (PSRE) control frame is transmitted from said primary station to said secondary station.

6. The system of claim 4 or 5 wherein whichever one of said primary station or secondary station receives said PSRE control frame transmits a confirmation control frame before the roles of said primary and secondary stations are interchanged.

7. In a communications network having a plurality of stations and a shared common communications medium using a collision avoidance media access protocol for communication between said stations, in which medium access is granted to a pair of stations obtaining a successful reservation of said medium, said pair of stations comprising a requester station and a target station, said requester station comprising a primary station, and said target station comprising a secondary station, wherein said primary station coordinates communication to said secondary station, other stations in range of said primary station comprising observing stations, the improvement, comprising a method of joining an observing station to a reservation wherein said primary station invites a selected observing station to participate in communication with it; said selected observing station responds thereto; said primary joins said selected observing station as a secondary station within said reservation in replacement of the secondary station in said reservation; and said primary station thereafter sends data to said replacement secondary station.

8. The method of claim 7 wherein said primary station sends a Request-to-Send control frame to said selected observing station and said selected observing station responds thereto with a Clear-to-Send control frame.

9. The method of claim 7 wherein said primary station will not join said selected observing station if a response is not received within a predetermined amount of time.

10. In a communications network having a plurality of stations and a shared common communications medium using a collision avoidance media access protocol for communication between said stations, in which medium access is granted to a pair of stations obtaining a successful reservation of said medium, said pair of stations comprising a requester station and a target station, wherein said communication medium is reserved based on requester transmission of a Request-to-Send (RTS) control frame and the reply thereto by a target station with a Clear-to-Send control frame when the target station is ready to receive data, a method of transmission control comprising the following steps: if said target station is not ready to receive data from said requesting station, sending a Hold-to-Send (HTS) control frame by said target station to said requesting station; said target station recording identification of said requesting station; and said requesting station recording said target station as being inhibited.

11. The method in claim 10 wherein said HTS control frame comprises a Clear to Send (CTS) control frame wherein said CTS is piggybacked with a flag indicating that said target node is not ready to receive.

12. The method of claim 10 wherein each node receiving said HTS control frame records said target station as inhibited.

13. The method of claim 10, and further comprising:
  said target station transmitting a Free to Send (FTS) control frame subsequent to said HTS frame;
  said requesting station recording said target station as uninhibited in response to receipt of said FTS control frame.

14. The method of claim 13 wherein all stations receiving said FTS control frame record said target station as uninhibited.

15. An improved communications method for a communications network having a plurality of stations and a shared common communications medium using a collision avoidance media access protocol for communication between said stations, in which medium access is granted to a pair of stations obtaining a successful reservation of said medium, said pair of stations comprising a requester station and a target station, said requester station comprising a primary station, and said target station comprising a secondary station, wherein said primary station coordinates communication to said secondary station, the improvement comprising the step of:
  interchanging of roles of said primary and secondary stations within said reservation, wherein said primary station becomes a secondary station and said secondary station becomes a primary station for communication therebetween.

16. The method of claim 15 wherein said interchanging of roles is initiated by said primary station.

17. The method of claim 15 wherein said interchanging of roles is initiated by said secondary station.

18. The method of claim 15 wherein said interchanging of roles is initiated by the transmission of a primary-secondary-role-exchange (PSRE) control frame between said primary station and said secondary station.

19. The method of claim 18 wherein said primary-secondary-role-exchange (PSRE) control frame is transmitted from said primary station to said secondary station.

20. The method of claim 18 or 19 wherein whichever one of said primary station or secondary station receives said PSRE control frame transmits a confirmation control frame before the roles of said primary and secondary stations are interchanged.

* * * * *